US012801572B2

(12) United States Patent
Koizumi

(10) Patent No.: US 12,801,572 B2
(45) Date of Patent: Nov. 17, 2026

(54) IMAGE PROCESSING DEVICE AND COMPUTER-READABLE MEDIUM

(71) Applicant: Shinji Koizumi, Numazu Shizuoka (JP)

(72) Inventor: Shinji Koizumi, Numazu Shizuoka (JP)

(73) Assignee: ETRIA CO., LTD., Kanagawa (JP)

( * ) Notice: Subject to any disclaimer, the term of this patent is extended or adjusted under 35 U.S.C. 154(b) by 0 days.

(21) Appl. No.: 19/276,295

(22) Filed: Jul. 22, 2025

(65) Prior Publication Data

US 2026/0211847 A1 Jul. 23, 2026

(30) Foreign Application Priority Data

Jan. 22, 2025 (JP) ................................ 2025-009200

(51) Int. Cl.

| | |
|---|---|
| ***G06F 16/16*** | (2019.01) |
| ***G06F 16/13*** | (2019.01) |
| ***G06F 16/174*** | (2019.01) |
| ***G06F 16/18*** | (2019.01) |
| ***G06F 16/23*** | (2019.01) |
| ***G06F 21/64*** | (2013.01) |

(52) U.S. Cl.
CPC .......... *G06F 16/162* (2019.01); *G06F 16/137* (2019.01); *G06F 16/1748* (2019.01); *G06F 16/18* (2019.01); *G06F 16/2358* (2019.01); *G06F 21/64* (2013.01)

(58) Field of Classification Search
CPC .. G06F 16/162; G06F 16/1748; G06F 16/137; G06F 16/18; G06F 21/64
USPC .......................................................... 707/609
See application file for complete search history.

(56) References Cited

U.S. PATENT DOCUMENTS

| | | | | |
|---|---|---|---|---|
| 10,700,853 | B2 * | 6/2020 | Kravitz | H04L 9/3236 |
| 10,922,279 | B1 * | 2/2021 | Amancharla | G06F 16/1748 |
| 11,163,900 | B2 * | 11/2021 | Ernst | G06F 21/86 |
| 11,468,017 | B2 * | 10/2022 | Nuttle | G06F 16/192 |
| 11,843,619 | B1 * | 12/2023 | Tamosiunas | H04L 63/0838 |
| 2010/0149591 | A1 | 6/2010 | Hase et al. | |
| 2012/0158734 | A1 * | 6/2012 | Chang | G06F 21/62<br>707/E17.049 |
| 2022/0100712 | A1 * | 3/2022 | Nuttle | G06F 16/164 |

(Continued)

FOREIGN PATENT DOCUMENTS

| | | | |
|---|---|---|---|
| JP | 2007241952 | A | 9/2007 |
| JP | 2010093469 | A | 4/2010 |

*Primary Examiner* — Shahid A Alam
(74) *Attorney, Agent, or Firm* — Duft & Bornsen, PC

(57) ABSTRACT

An image processing device includes: an information reader configured to read the certificate information stored in a storage medium held in a holder; a file data generator configured to execute file data generation processing to generate file data; a signer configured to add, to the generated file data, signature information with respect to the file data using the read certificate information; and a communication processor configured to transmit the file data to which the signature information is added to a management device. The file data generator is configured to generate the file data and temporarily store the file data as an incomplete job, and store information including a path of the file data of the incomplete job in a storage after continuing the file data generation processing until completion in a case where the storage medium is released from the holder during generation of the file data.

20 Claims, 10 Drawing Sheets

(56) References Cited

U.S. PATENT DOCUMENTS

2023/0281173 A1 * 9/2023 Jaisawal ............ G06F 16/2358
707/692

* cited by examiner

IMAGE PROCESSING DEVICE AND COMPUTER-READABLE MEDIUM

CROSS-REFERENCE TO RELATED APPLICATIONS

The present application claims priority under 35 U.S.C. § 119 to Japanese Patent Application No. 2025-009200, filed on Jan. 22, 2025. The contents of which are incorporated herein by reference in their entirety.

BACKGROUND

Technical Field

Embodiments described herein relate to an image processing device and a computer-readable medium.

Related Art

In the related art, a common access card (CAC), a personal identity verification card (PIV), or the like has been known as a smart card in which a digital certificate of a card owner is stored inside the card. It is known that the smart card in a manner described above is used for a user authentication function and a function of adding a digital signature to a scanned document by insertion into a card reader connected to a multifunction peripheral/printer/product (MFP) and reading of a digital certificate.

According to the above-described function, for example, in a case where a card is erroneously removed from the card reader while an original is scanned and a document is generated by the MFP, a logged-in user is forcibly logged out, and an ongoing scan job is canceled. Thus, in a case where the card is erroneously removed from the card reader, the user has to perform reading of the original from the beginning after inserting the card into the card reader again and the user authentication is performed.

DETAILED DESCRIPTION

An image processing device according to an embodiment includes a holder, an information reader, a file data generator, a signer, and a communication processor. The holder is configured to hold a storage medium in a manner that enables certificate information stored in the storage medium to be read. The information reader is configured to read the certificate information stored in the storage medium held in the holder. The file data generator is configured to execute file data generation processing to generate file data. The signer is configured to add, to the generated file data, signature information with respect to the file data using the read certificate information. The communication processor is configured to transmit the file data to which the signature information is added to a management device. The file data generator is configured to generate the file data and temporarily stores the file data as an incomplete job, and store information including a path of the file data of the incomplete job in a storage after continuing the file data generation processing until completion in a case where the storage medium is released from the holder during generation of the file data.

An embodiment may provide an image processing device and a computer-readable medium capable of resuming a job from the middle without having to perform file data generation processing from the beginning after causing a holding unit to hold a storage medium again even when the storage medium is erroneously removed from the holding unit during execution of the job.

Figure 1:
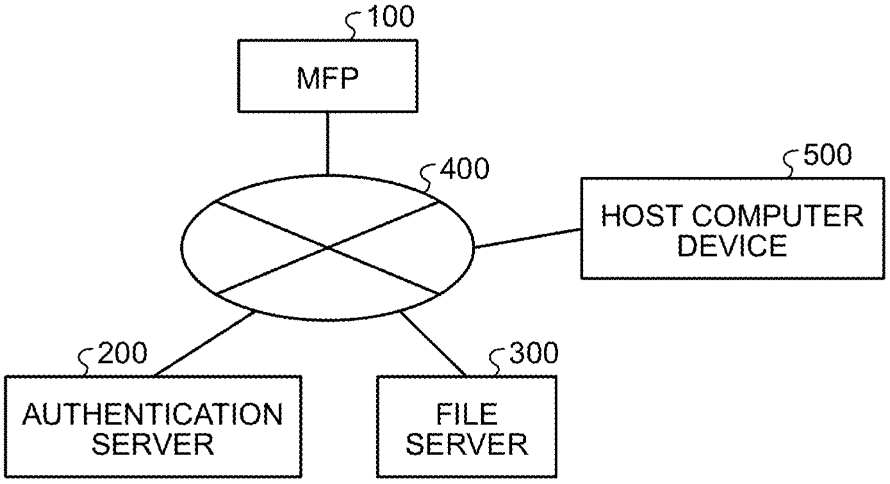
FIG. 1 is a view illustrating an overall configuration of an image processing system according to an embodiment.

FIG. 1 is a view illustrating an overall configuration of an image processing system according to an embodiment. As illustrated in FIG. 1, an image processing system according to the present embodiment includes a multifunction peripheral/printer/product (MFP) 100 as an example of an image processing device, an authentication server 200, a file server 300, and a host computer device 500 such as a personal computer (PC). The authentication server 200, the file server 300, and the host computer device 500 are connected to the MFP 100 via a network 400 such as a wireless network or the Internet. Although the one MFP 100, one authentication server 200, one file server 300, and one host computer device 500 are connected in FIG. 1, this is not a limitation and it goes without saying that a plurality thereof may be connected.

The MFP 100 is generally called a multifunction peripheral having at least two functions among a copier function, a printer function, a scanner function, and a facsimile function.

The authentication server 200 includes a computer. The authentication server 200 is, for example, a server that verifies a certificate (certificate information) for authentication of an IC card 8 which certificate is sent from the MFP 100. More specifically, the authentication server 200 performs user authentication of permission for use of the MFP 100 by the user according to user information stored in the certificate for authentication of the IC card 8. The authentication server 200 sends a user authentication result to the MFP 100.

The file server 300 includes a computer. The file server 300 is, for example, a server that stores image data (file data) scanned by the MFP 100.

The host computer device 500 includes a computer. The host computer device 500 transmits image data or the like of an image to be printed to the MFP 100.

First, a configuration of the MFP 100 will be described.

Figure 2:
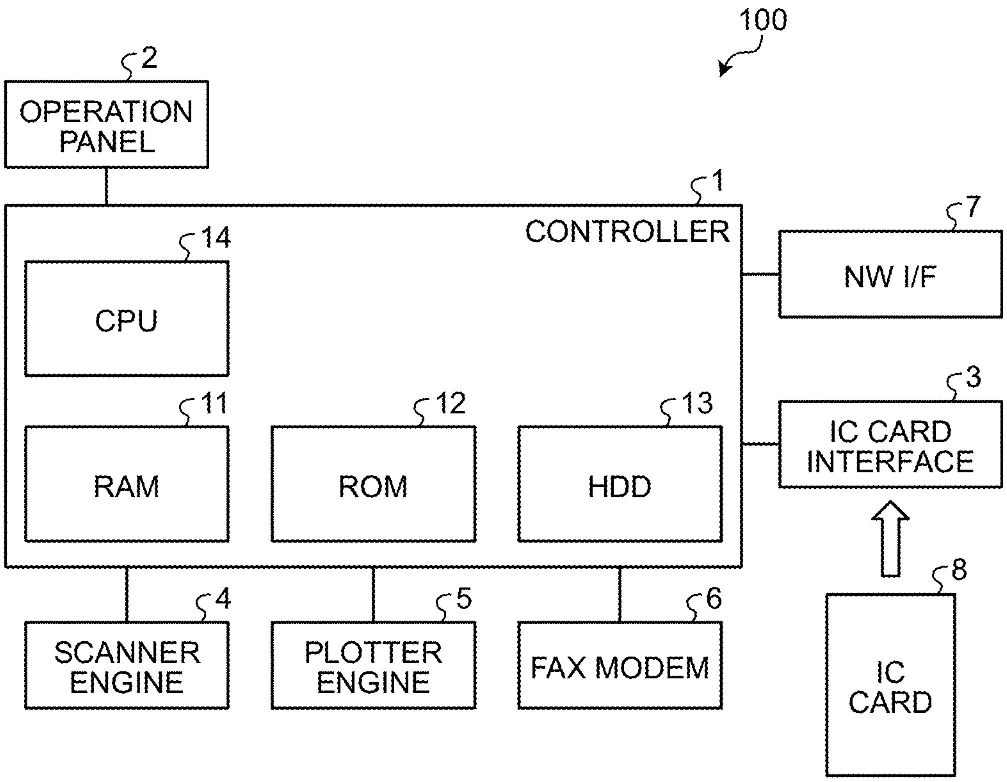
FIG. 2 is a hardware configuration diagram of an MFP.

FIG. 2 is a hardware configuration diagram of the MFP 100. As illustrated in FIG. 2, the MFP 100 includes a controller 1, an operation panel 2, an IC card interface 3, a scanner engine 4, a plotter engine 5, a modem device for facsimile (FAX modem) 6, and a network interface (NW I/F) 7.

The controller 1 includes a random access memory (RAM) 11, a read only memory (ROM) 12, a hard disk drive (HDD) 13, and a central processing unit (CPU) 14. The HDD 13 is an example of a storage unit (storage).

The RAM 11 is a so-called work area, and is used, for example, for development processing of image data of an image to be printed. In addition, the RAM 11 is used, for example, for loading processing of various application programs. Furthermore, the RAM 11 is also used as a temporary storage area or the like of data processed by each of the application programs. The ROM 12 stores a program of a so-called operation system (OS) which is a program executed when the MFP 100 is activated, and various kinds of data.

In addition to a job restart program, various application programs, a user interface (UI) control program, a FAX control program, a scanner control program, a copier control program, and the like are stored in the HDD 13. Although details will be described later, a temporary folder that stores file data, an incomplete job management database, and the like are formed in the HDD 13.

The various application programs stored in the HDD 13 include a program developed by a third-party vendor (third party) in addition to a program developed by a manufacturer of the MFP 100.

The job restart program is read and executed by the CPU 14, and enables execution of processing of restarting a job from the middle in a case where an operator erroneously removes the IC card 8 from the IC card interface 3. The UI control program is read and executed by the CPU 14, and enables display control of the operation panel 2 and execution of information processing corresponding to touch operation.

The CPU 14 operates according to the OS stored in the ROM 12. Further, the CPU 14 loads the job restart program, various application programs, various control programs, and the like stored in the HDD 13 into the RAM 11 and executes these programs.

The job restart program executed by the MFP 100 of the present embodiment may be provided by being recorded in a computer-readable recording medium such as a CD-ROM, a flexible disk (FD), a CD-R, or a digital versatile disc (DVD) as a file in an installable format or an executable format.

Furthermore, the job restart program executed by the MFP 100 of the present embodiment may be stored on a computer connected to the network 400 such as the Internet and provided by being downloaded via the network 400. In addition, the job restart program executed by the MFP 100 of the present embodiment may be provided or distributed via the network 400 such as the Internet.

The operation panel 2 is a display panel with a touch detection function in which a touch panel formed of a transparent electrode or the like is provided on a liquid crystal display panel. The operation panel 2 is connected to the controller 1 via, for example, a peripheral component interconnect (PCI) bus line. A user performs contact operation on a button or the like displayed on the liquid crystal display panel. The CPU 14 detects a command corresponding to the button or the like displayed at a contact operation portion. The CPU 14 executes processing corresponding to the detected command.

The IC card 8 with an IC chip is inserted and held in the IC card interface 3. Note that the IC card 8 is an example of a storage medium. The IC card interface 3 includes an insertion portion of the IC card 8, and a reader/writer unit that reads and writes information from and into the IC card 8 inserted and held in the insertion portion.

The IC card 8 is an IC card in which certificate information of a card owner is stored inside the card, such as a common access card (CAC) or a personal identity verification card (PIV). The certificate information includes a certificate for authentication which stores user information (such as specific number and user name) for logging into the MFP 100, and a certificate of a digital signature. That is, the IC card interface 3 is a holding unit (holder) that holds the IC card 8 in a manner that enables the certificate information stored in the IC card 8 to be read.

Note that the IC card interface 3 is illustrated to communicate with the controller 1 in a wired manner in FIG. 2. However, the IC card interface 3 may be configured to wirelessly communicate with the controller 1.

Note that although the IC card 8 that is the example of the storage medium is inserted and held in the IC card interface 3 the present embodiment, this is not a limitation. For example, the IC card interface 3 may hold the IC card 8, which is the example of the storage medium, in a placed manner and read and write information from and into the held IC card 8 by a near field communication technology. In addition, the storage medium is not limited to a card shape such as the IC card 8, and may be an RFID tag or the like.

The scanner engine 4 optically reads an original placed, for example, on an automatic original reading device, and generates image data.

The plotter engine 5 prints the image by transferring a toner image formed on a photosensitive drum onto recording paper by, for example, an electrophotographic process method.

The FAX modem 6 receives a facsimile image transmitted via a telephone line, and transmits the facsimile image via the telephone line.

The NW I/F 7 is an interface that establishes connection between a server device (authentication server 200 or file server 300) or the host computer device 500 and the MFP 100 on the network 400, for example. The MFP 100 can acquire the image data or the like of the image to be printed from the host computer device 500 or the like connected via the NW I/F 7.

Next, among functions realized by the controller 1 of the MFP 100, a characteristic function in the present embodiment is realized by the controller 1 according to the job restart program will be described.

Figure 3:
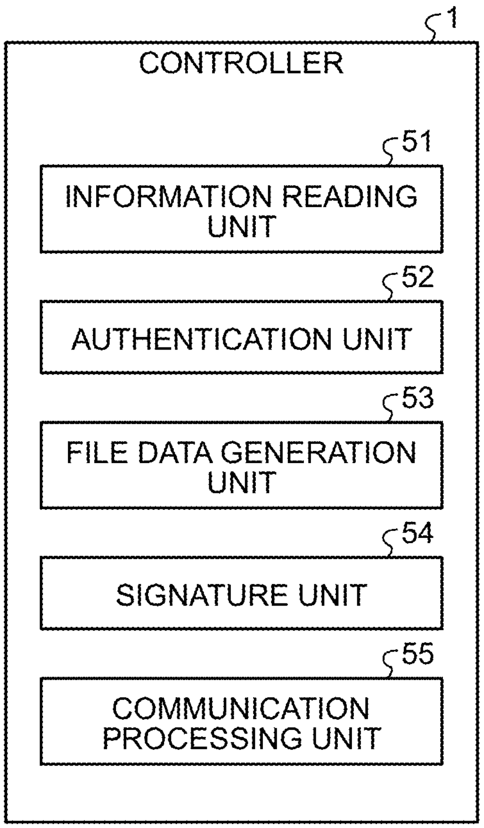
FIG. 3 is a functional block diagram illustrating a functional configuration of the MFP.

FIG. 3 is a functional block diagram illustrating a functional configuration of the MFP 100.

As illustrated in FIG. 3, the MFP 100 includes an information reading unit (information reader) 51, an authentication unit (authenticator) 52, a file data generation unit (file data generator) 53, a signature unit (signer) 54, and a communication processing unit (communication processor) 55.

The information reading unit 51 reads a digital certificate stored in the IC card 8 held in the IC card interface 3.

The authentication unit 52 executes user authentication using the read digital certificate.

When the user authentication is successful, the file data generation unit 53 executes file data generation processing and generates file data. The file data generation processing includes processing such as original reading processing, file conversion processing, and OCR processing. In addition, in a case where the IC card 8 is released from the IC card interface 3 during the generation of the file data, the file data generation unit 53 continues the file data generation processing until completion, and then generates and temporarily stores the file data as an incomplete job, and stores information including a path of the file data of the incomplete job in the storage unit (such as the HDD 13).

The signature unit 54 adds, to the generated file data, signature information with respect to the file data by using the digital certificate. In addition, in a case where user authentication of the IC card 8 newly held in the IC card interface 3 is successful in the authentication unit 52, and in a case where there is file data of an incomplete job related to a user whose user authentication is successful, the signature unit 54 executes processing of adding signature information of the file data of the incomplete job to the file data of the incomplete job using the digital certificate stored in the IC card 8.

Furthermore, in a case where there is the file data of the incomplete job related to the user whose user authentication is successful, and in a case where the file data of the incomplete job is within a predetermined storage period, the signature unit 54 executes the processing of adding the signature information.

Furthermore, in a case where there is the file data of the incomplete job related to the user whose user authentication is successful, and in a case where the file data of the incomplete job is within the predetermined storage period, the signature unit 54 notifies that there is the file data of the incomplete job, and allows the user to select whether to restart the incomplete job.

Furthermore, after executing the processing of adding the signature information, the signature unit 54 deletes the temporarily-stored file data of the incomplete job, and deletes the file data of the incomplete job stored in the storage unit (such as the HDD 13).

The communication processing unit 55 transmits the file data to which the signature information is added to the host computer device 500 or the like.

Next, a flow of image reading processing executed by the controller 1 of the MFP 100 according to the job restart program will be described. Hereinafter, the flow of the image reading processing in the MFP 100 will be described in several sections.

Figure 4:
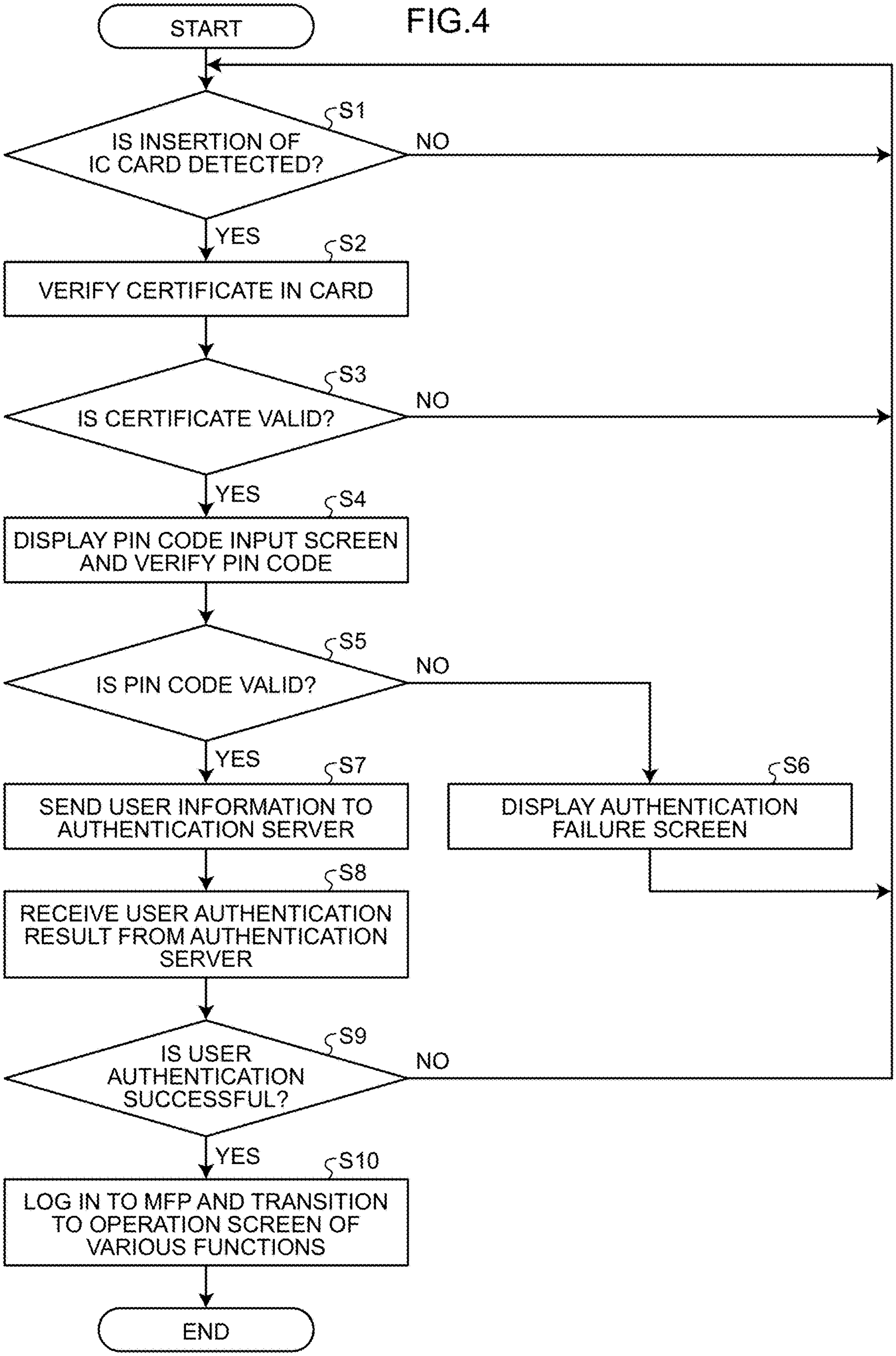
FIG. 4 is a flowchart illustrating a flow until user authentication is completed.
Figure 5:
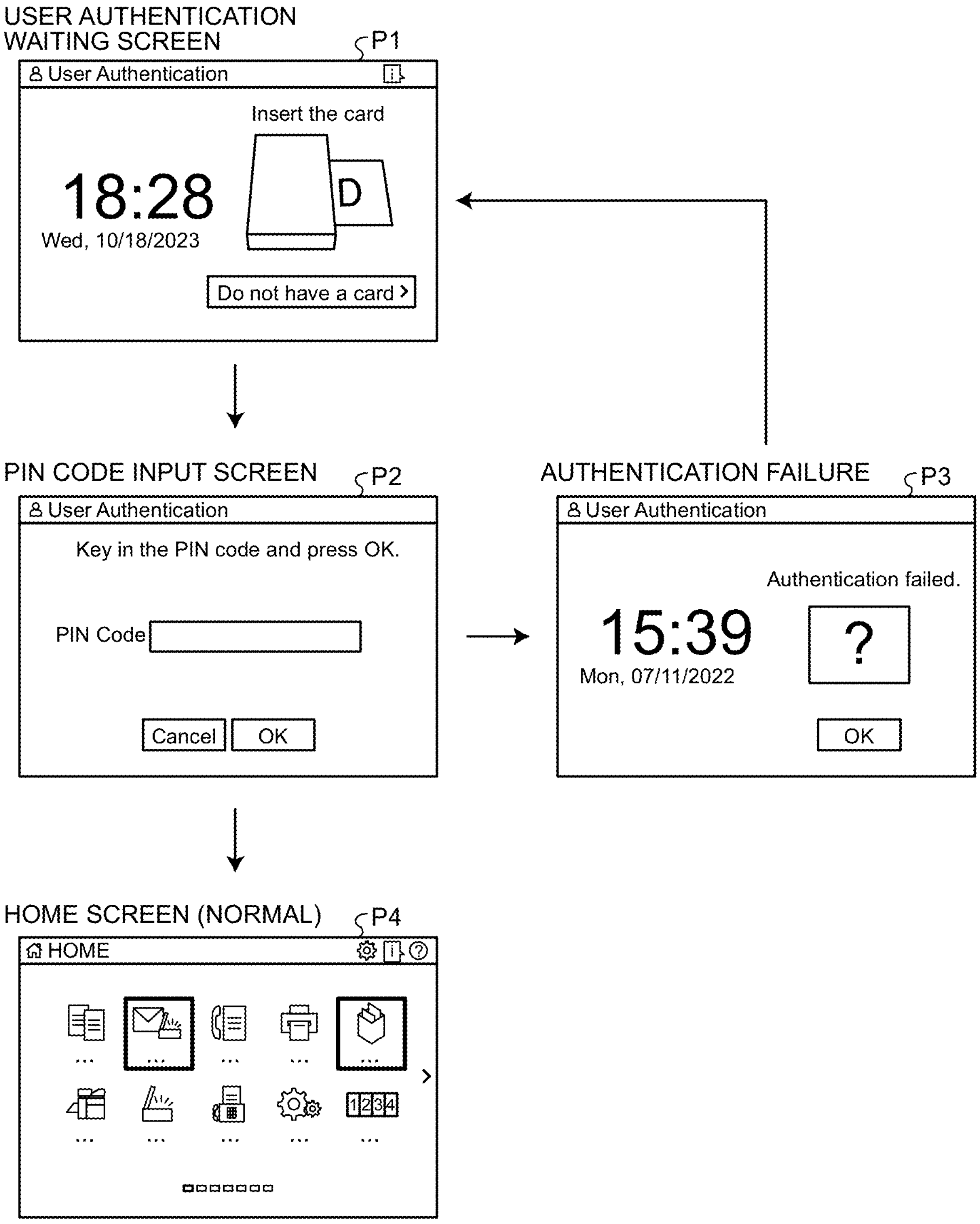
FIG. 5 is a view illustrating screen transition until the user authentication is completed.

Here, FIG. 4 is a flowchart illustrating a flow until the user authentication is completed, and FIG. 5 is a view illustrating screen transition until user authentication is completed.

Note that when the MFP 100 is activated, the operation panel 2 displays a user authentication waiting screen P1 (see FIG. 5). In a state in which the user authentication waiting screen P1 is displayed on the operation panel 2, the MFP 100 cannot use various functions included in the MFP 100.

As illustrated in FIG. 4, when detecting that the IC card 8 is inserted into the IC card interface 3 (Yes in Step S1), the information reading unit 51 of the MFP 100 sends the certificate for authentication which is stored in the IC card 8 to the authentication server 200 connected via the network 400, and verifies the certificate for authentication (Step S2).

In a case where the authentication unit 52 of the MFP 100 acquires a verification result that the certificate for authentication is invalid (No in Step S3), the processing ends and returns to Step S1. Here, a case where the certificate for authentication is invalid includes a case where a card expiration date is expired, a case where use of the IC card 8 is locked, and the like.

In a case where a verification result that the certificate for authentication is valid is acquired (Yes in Step S3), the authentication unit 52 of the MFP 100 displays a PIN code input screen P2 (see FIG. 5) on the operation panel 2 and verifies a PIN code input by the user with the certificate for authentication in the IC card 8 (Step S4).

As illustrated in FIG. 5, the PIN code input screen P2 receives an input of a personal identification number (PIN) code that is a number for identifying an individual.

In a case where the authentication unit 52 of the MFP 100 acquires a verification result that the PIN code is invalid (No in Step S5), the authentication unit 52 of the MFP 100 displays an authentication failure screen P3 (see FIG. 5) on the operation panel 2 (Step S6), and then ends the processing and returns to Step S1.

On the other hand, in a case of acquiring a verification result that the PIN code is valid (Yes in Step S5), the authentication unit 52 of the MFP 100 proceeds to Step S7.

The information reading unit 51 of the MFP 100 extracts the user information (such as specific number and user name) stored in the certificate for authentication of the IC card 8, and sends the extracted user information to the authentication server 200 (Step S7).

The authentication server 200 performs user authentication of permission for use of the MFP 100 by the user according to the sent user information. The authentication server 200 sends a user authentication result to the MFP 100.

The authentication unit 52 of the MFP 100 receives the user authentication result from the authentication server 200 (Step S8).

In a case where the user authentication in the authentication server 200 fails (No in Step S9), the authentication unit 52 of the MFP 100 ends the processing and returns to Step S1.

On the other hand, in a case where the user authentication in the authentication server 200 is successful (Yes in Step S9), the authentication unit 52 of the MFP 100 logs in to the MFP 100 and transitions to a home screen P4 (see FIG. 5) on which various functions can be operated (Step S10).

Next, a case where a scanning function as an example of various functions executed by the MFP 100 is selected from the home screen P4 (see FIG. 5) will be described.

Figure 6:
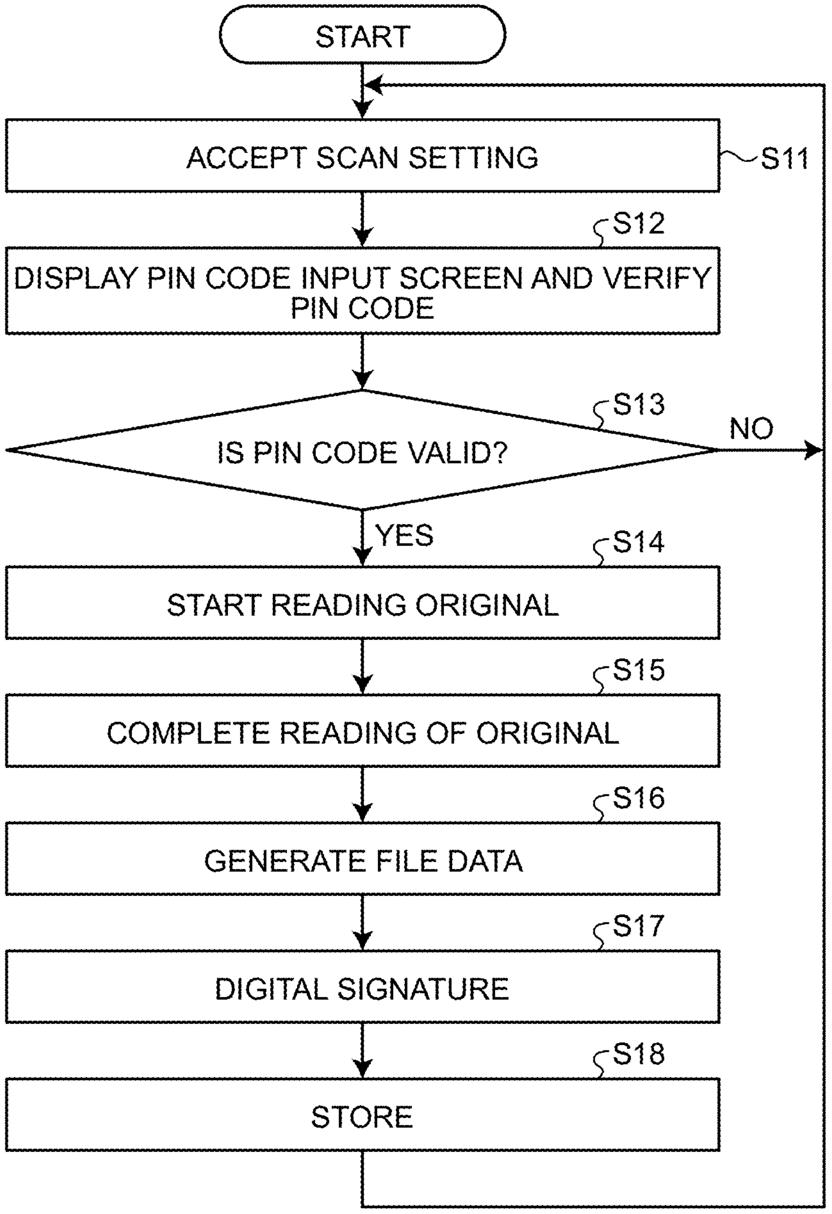
FIG. 6 is a flowchart illustrating a flow until a scan job is successfully ended.
Figure 7:
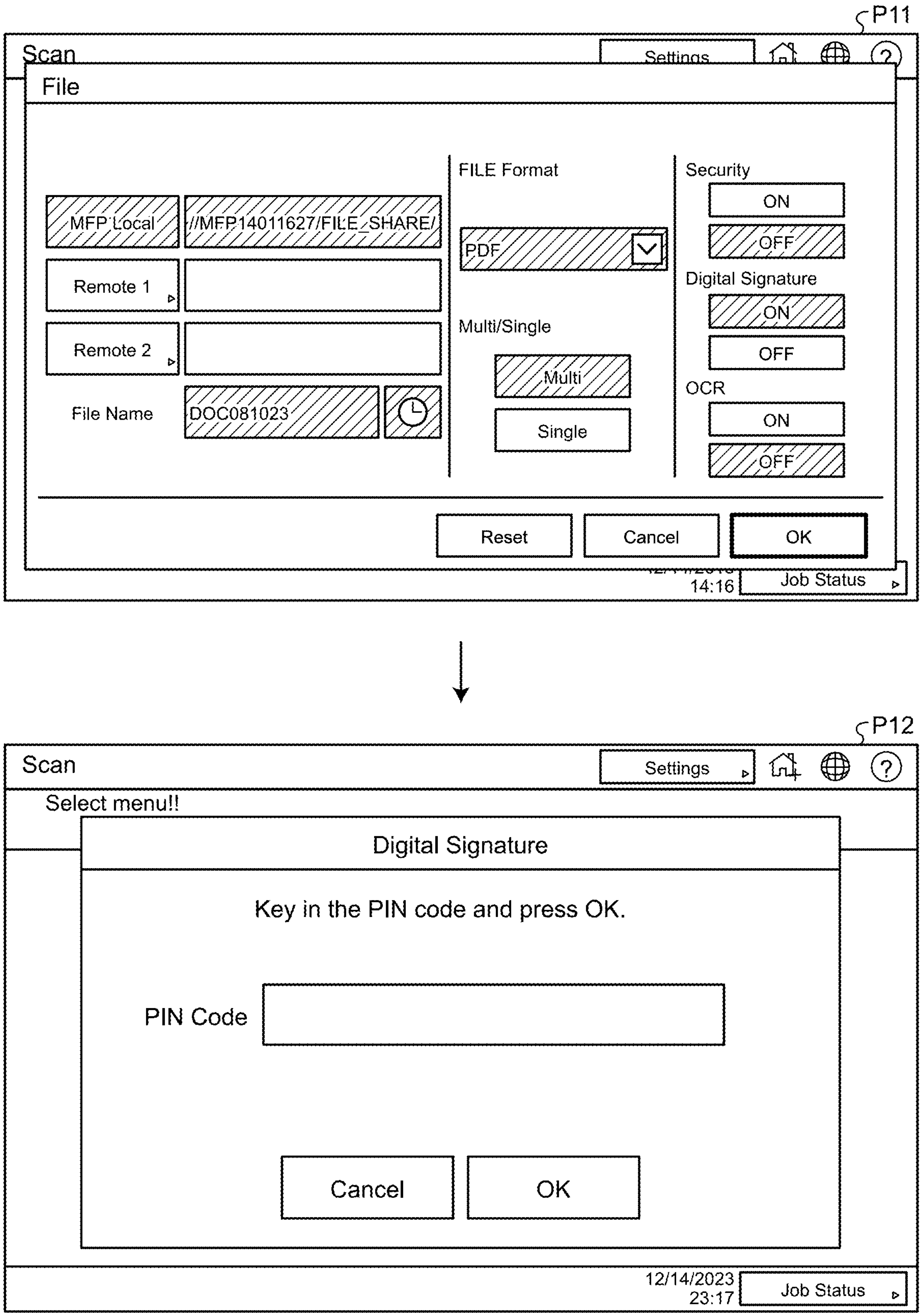
FIG. 7 is a view illustrating screen transition until the scan job is successfully ended.

Here, FIG. 6 is a flowchart illustrating a flow until the scan job is successfully ended, and FIG. 7 is a view illustrating screen transition until the scan job is successfully ended.

The scanning function is, for example, a function in which the user scans a paper original and saves a document digitally signed with the certificate of the digital signature in the IC card 8 inserted into the IC card interface 3 into an arbitrary saving destination (such as the inside of the MFP 100, or the file server 300 connected via the network 400) (Scan to File function).

As illustrated in FIG. 6, when the scanning function is selected, the file data generation unit 53 of the MFP 100 displays an operation screen P11 of the scanning function (see FIG. 7), and accepts various scan settings by the authenticated user in advance (Step S11).

As illustrated in FIG. 7, the scan setting on the operation screen P11 of the scanning function is set by selection of, for example, color/monochrome setting, an output file format (such as PDF), OCR setting, validity/invalidity setting of the digital signature, and the like.

Next, the authentication unit 52 of the MFP 100 displays the PIN code input screen P12 (see FIG. 7) on the operation panel 2, and verifies the PIN code input by the user with the certificate of the digital signature in the IC card 8 (Step S12). Here, the PIN authentication is required since it is necessary to access the certificate of the digital signature in the IC card 8 in order to digitally sign the document.

In a case of acquiring a verification result that the PIN code is invalid (No in Step S13), the authentication unit 52 of the MFP 100 returns to Step S11.

On the other hand, in a case of acquiring a verification result that the PIN code is valid (Yes in Step S13), the authentication unit 52 of the MFP 100 proceeds to Step S14.

The file data generation unit 53 of the MFP 100 controls the scanner engine 4 and starts reading an original placed on the automatic original reading device (Step S14).

When controlling the scanner engine 4 and completing reading of the original placed on the automatic original reading device (Step S15), the file data generation unit 53 of the MFP 100 proceeds to Step S16.

When the original reading is completed, the file data generation unit 53 of the MFP 100 converts read image data into a designated file format, and executes processing and generates file data when OCR or the like is set (Step S16).

Then, the signature unit 54 of the MFP 100 digitally signs the file data, which is generated in Step S16, using the certificate of the digital signature in the IC card 8 (Step S17).

The communication processing unit 55 of the MFP 100 stores the file data digitally signed in Step S17 in an arbitrary storage unit (such as the HDD 13) set in advance (Step S18), ends the job, and returns to Step S11.

Then, the user may remove the IC card 8 inserted into the IC card interface 3 and log out, or may execute another job.

Incidentally, in the scanning function described above, for example, in a case where the IC card 8 inserted into the IC card interface 3 is erroneously removed while the MFP 100 is scanning the original and generating the file data, the logged-in user is forcibly logged out, and the ongoing scan job is canceled. Thus, in a case where the card is erroneously removed from the IC card interface 3, the user needs to read the original from the beginning after inserting the IC card 8 into the IC card interface 3 and performing the user authentication again.

This is because, in a case where the card is erroneously removed from the IC card interface 3, the ongoing job cannot be completed since the certificate of the digital signature cannot be read from the IC card 8, and the ongoing job is discarded from a viewpoint of security protection.

Figure 8:
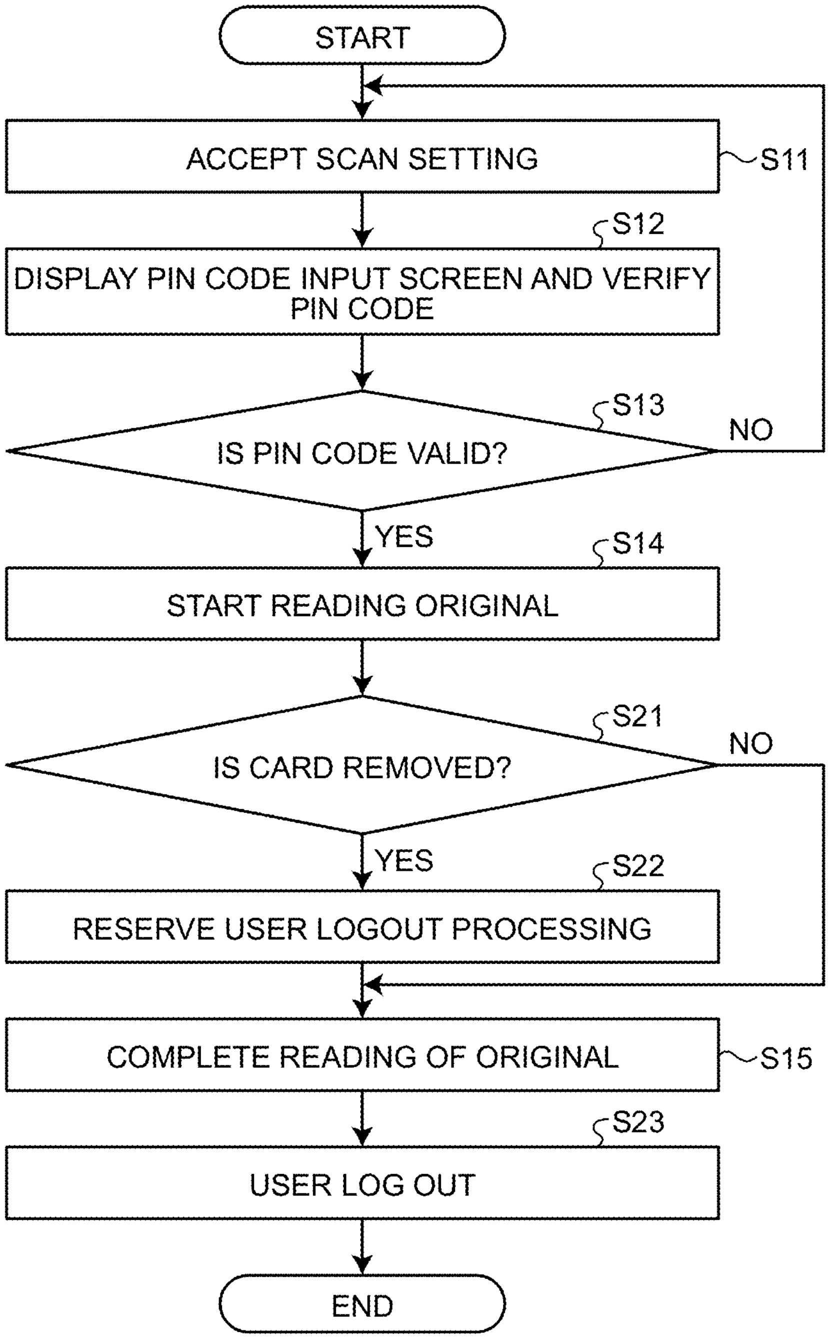
FIG. 8 is a flowchart illustrating a conventional flow of when an IC card is removed during execution of a scan job.

Here, FIG. 8 is a flowchart illustrating a conventional flow of when the IC card 8 is removed during execution of a scan job. Note that the same processing as the processing described in FIG. 6 is denoted by the same step number, and description thereof will be omitted.

As illustrated in FIG. 8, after starting reading an original placed on the automatic original reading device (Step S14), in a case of detecting that the IC card 8 inserted into the IC card interface 3 is removed (Yes in Step S21), the file data generation unit 53 of the MFP 100 reserves user logout processing (Step S22), and continues reading of the original until completion.

Then, when controlling the scanner engine 4 and completing reading of the original placed on the automatic original reading device (Step S15), the file data generation unit 53 of the MFP 100 discards an ongoing job such as read data and makes the user log out (Step S23).

Next, a flow of the present embodiment will be described.

Figure 9:
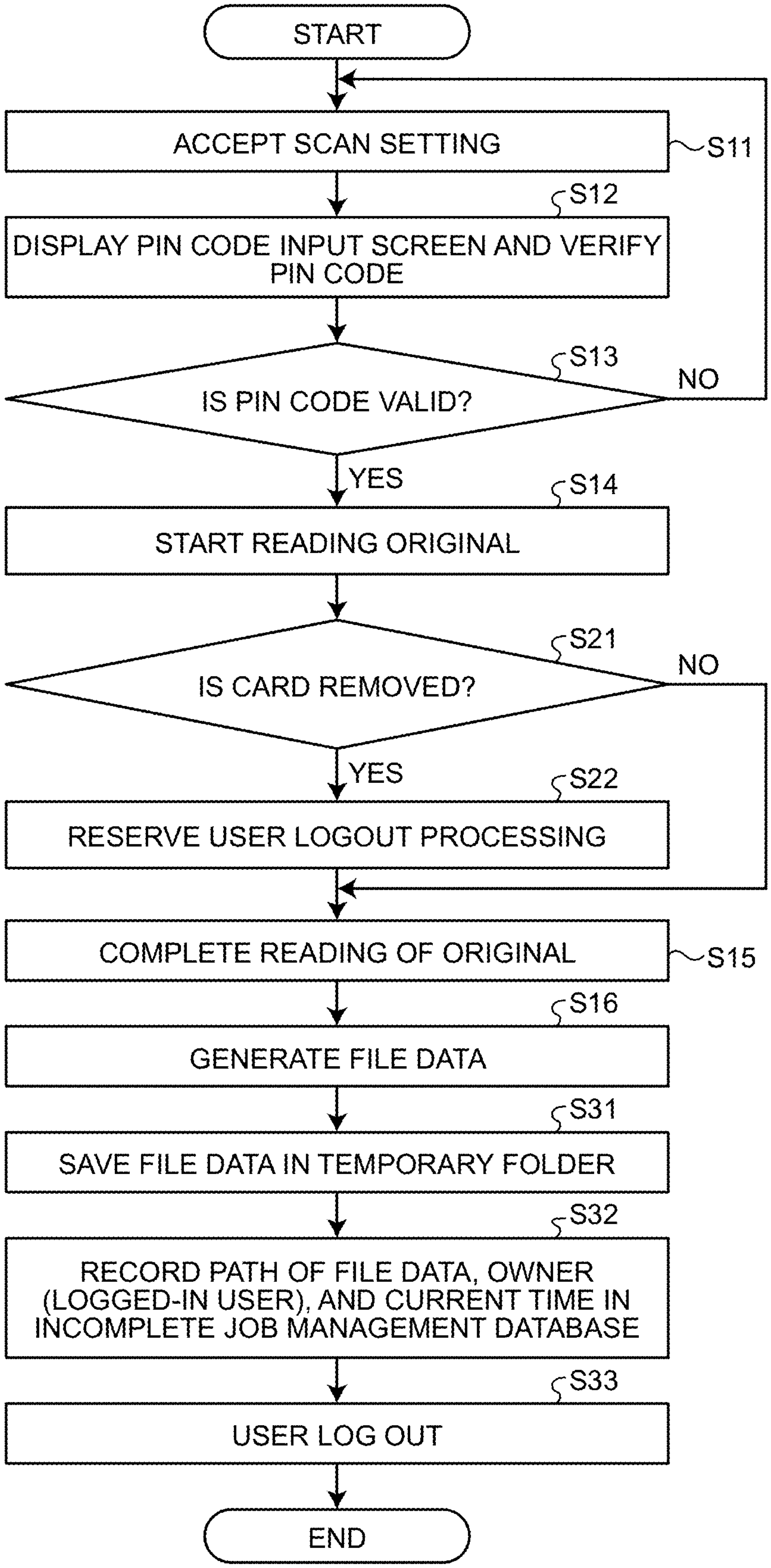
FIG. 9 is a flowchart illustrating a flow of when an IC card is removed during execution of the scan job.

Here, FIG. 9 is a flowchart illustrating a flow of when the IC card 8 is removed during execution of the scan job. Note that the same processing as the processing described in FIG. 6 is denoted by the same step number, and description thereof will be omitted.

In addition, as illustrated in FIG. 9, in a case of detecting that the IC card 8 inserted into the IC card interface 3 is removed (Yes in Step S21) after starting reading the original placed on the automatic original reading device (Step S14), the file data generation unit 53 of the MFP 100 reserves the user logout processing (Step S22), and continues reading of the original until completion, similarly to the conventional processing described with reference to FIG. 8.

Then, when controlling the scanner engine 4 and completing reading of the original placed on the automatic original reading device (Step S15), the file data generation unit 53 of the MFP 100 proceeds to Step S16.

When the original reading is completed, the file data generation unit 53 of the MFP 100 converts read image data into a designated file format, and executes processing and generates file data when OCR or the like is set (Step S16).

Then, since the IC card 8 is removed and the digital signature cannot be added, the file data generation unit 53 of the MFP 100 saves the file data as an incomplete job in the predetermined temporary folder of the HDD 13 (Step S31).

Then, the file data generation unit 53 of the MFP 100 stores a path of the file data saved in the temporary folder, an owner (user who logs in and executes the job), and a current time (date and time when the job is executed) in the incomplete job management database held in the HDD 13 in the MFP 100 (Step S32).

Then, the file data generation unit 53 of the MFP 100 makes the user log out (Step S33).

Next, a case where the same IC card 8 is inserted into the IC card interface 3 and the user authentication is performed again will be described.

Figure 10:
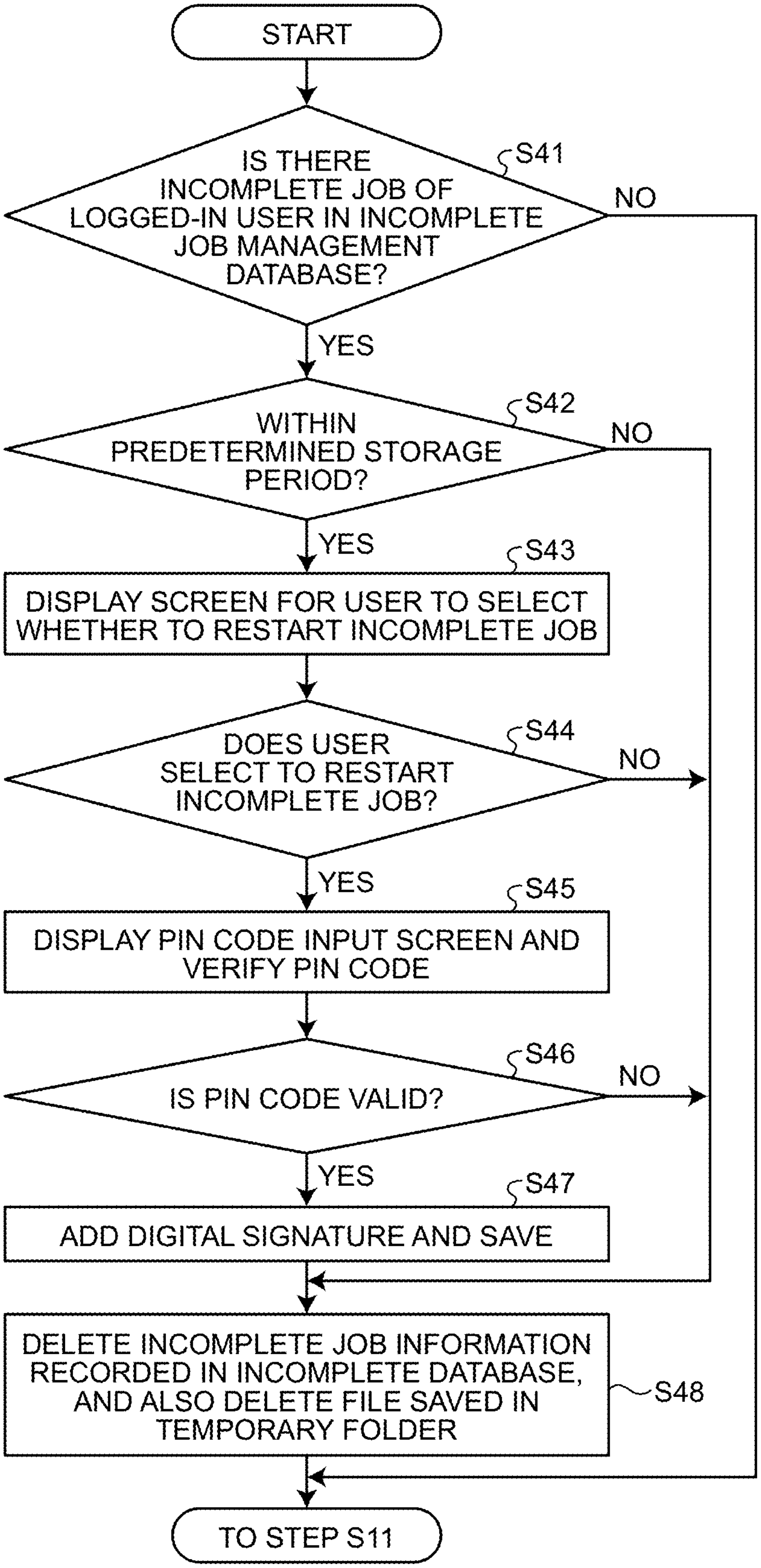
FIG. 10 is a flowchart illustrating a flow after the same user logs in as when the IC card is removed during the execution of the scan job.

Here, FIG. 10 is a flowchart illustrating a flow after the same user logs in as when the IC card 8 is removed during execution of the scan job, and FIG. 7 is a view illustrating screen transition after the same user logs in as when the IC card 8 is removed during execution of the scan job.

As illustrated in FIG. 10, after the user logs in, the file data generation unit 53 of the MFP 100 checks whether there is an incomplete job of the currently logged-in user in the incomplete job management database held in the HDD 13 of the MFP 100 (Step S41).

In a case where there is no incomplete job of the logged-in user (No in Step S41), the file data generation unit 53 of the MFP 100 proceeds to Step S11.

On the other hand, in a case where there is the incomplete job of the logged-in user (Yes in Step S41), the file data generation unit 53 of the MFP 100 checks whether the incomplete job is within a predetermined storage period (Step S42).

In a case where the incomplete job exceeds the predetermined storage period (No in Step S42), the file data generation unit 53 of the MFP 100 proceeds to Step S48 described later.

On the other hand, in a case where the incomplete job is within the predetermined storage period (Yes in Step S42), the file data generation unit 53 of the MFP 100 displays, on the operation panel 2 of the MFP 100, a screen P21 (see FIG. 11) to make the user select whether to restart the incomplete job (Step S43).

Figure 11:
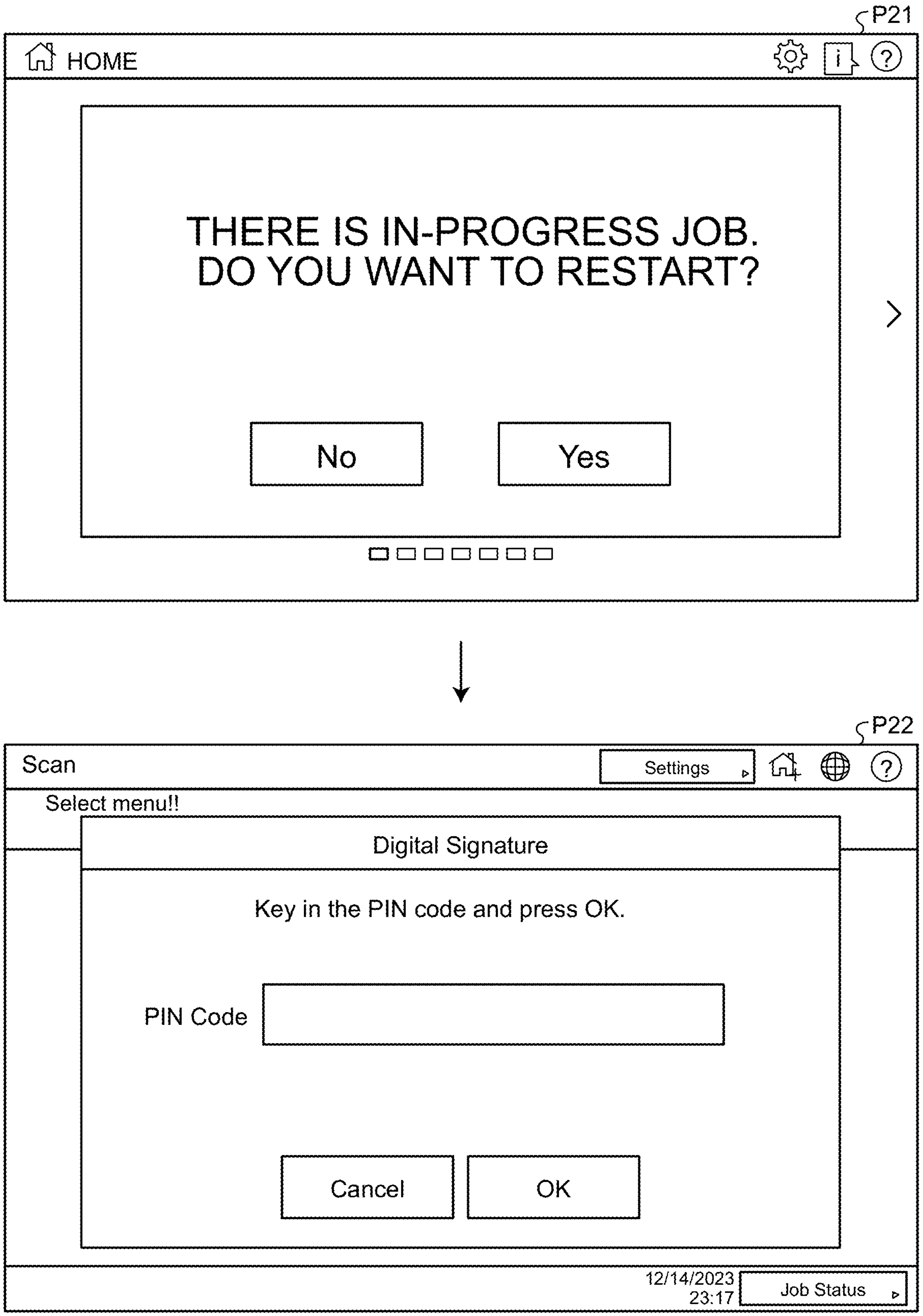
FIG. 11 is a view illustrating screen transition after the same user logs in as when the IC card is removed during the execution of the scan job.

As illustrated in FIG. 11, the screen P21 to make the user make the selection is a screen for notifying that there is the incomplete job and prompting the user to determine whether to restart the incomplete job.

In a case where the user selects not to restart the incomplete job (No in Step S44), the file data generation unit 53 of the MFP 100 proceeds to Step S48 described later.

In a case where the user selects to restart the incomplete job (Yes in Step S44), the file data generation unit 53 of the MFP 100 proceeds to Step S45.

The authentication unit 52 of the MFP 100 displays a PIN code input screen P22 (see FIG. 11) on the operation panel 2, and verifies a PIN code input by the user with the certificate of the digital signature in the IC card 8 (Step S45). Here, the PIN authentication is required since it is necessary to access the certificate of the digital signature in the IC card 8 in order to digitally sign the document.

In a case where a verification result that the PIN code is invalid is acquired (No in Step S46), the authentication unit 52 of the MFP 100 proceeds to Step S48 described later.

On the other hand, in a case where a verification result that the PIN code is valid is acquired (Yes in Step S46), the authentication unit 52 of the MFP 100 proceeds to Step S47.

After accessing the IC card 8 and adding the digital signature using the certificate of the digital signature in the IC card 8, the file data generation unit 53 of the MFP 100 saves the file data of the incomplete job in the temporary folder in an arbitrary saving destination set in advance (Step S47).

Finally, the file data generation unit 53 of the MFP 100 deletes the file data of the incomplete job in the temporary folder, deletes information of the incomplete job from the incomplete job management database (Step S48), and proceeds to Step S11.

Note that the user may proceed to Step S11 and execute another job, or may remove the IC card 8 from the IC card interface 3 and log out.

As described above, according to the image processing device of the embodiment, in the function in which the IC card 8 storing the digital certificate of the card owner is inserted into the IC card interface 3 connected to the MFP 100 and the user authentication is performed and the digital signature is added to the scanned document by utilization of the digital certificate in the IC card 8, when the IC card 8 is erroneously removed while the document is being generated by scanning, the ongoing job is saved as a file in a storage area inside the MFP 100, and the user information such as the name of the user logged in to the MFP 100 and the information such as the job execution date and time are associated with the file. When the same IC card 8 is inserted and the user is authenticated again, in a case where there is the held incomplete job and the user associated with the job and the user logged in again are the same, the job is displayed, and the user is made to determine whether to continue the job.

That is, according to the image processing device of the embodiment, even when the IC card 8 is erroneously removed from the IC card interface 3 during the execution of the job, it is not necessary to read the original from the beginning after the user authentication is performed by inserting the IC card 8 into the IC card interface 3 again, and the job can be restarted from the middle by utilization of the held incomplete job.

In addition, according to the image processing device of the embodiment, from the viewpoint of security protection, the temporarily stored halfway job file is automatically discarded after a predetermined storage period.

Note that although the MFP 100 is applied as an example of the image processing device in the present embodiment, this is not a limitation. The image processing device may be, for example, an output device such as a projector (PJ), an interactive white board (IWB) (white board having an electronic blackboard function capable of mutual communication), or a digital signage, a head up display (HUD) device, an industrial machine, an imaging device, a sound collecting device, a medical device, a network home appliance, an automobile (connected car), a notebook personal computer (PC), a cell phone, a smartphone, a tablet terminal, a game console, a personal digital assistant (PDA), a digital camera, a wearable PC, a desktop PC, or the like.

Any of the above-described apparatus, devices or units can be implemented as a hardware apparatus, such as a special-purpose circuit or device, or as a hardware/software combination, such as a processor executing a software program.

Further, as described above, any one of the above-described and other methods may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Each of the functions of the described embodiments, and any one of the above-described and other methods may be implemented by one or more processing circuits or circuitry. Processing circuitry includes a programmed processor, as a processor includes circuitry. A processing circuit includes devices such as an application specific integrated circuit (ASIC), digital signal processor (DSP), field programmable gate array (FPGA) and conventional circuit components arranged to perform the recited functions.

As used herein, the singular forms "a", "an" and "the" are intended to include the plural forms as well, unless the context clearly indicates otherwise.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:

a controller comprising a processor and memory, the processor configured to:

read certificate information stored in a storage medium inserted into a storage medium holder by a user;

execute file data generation processing to generate file data;

add, to the file data, signature information with respect to the file data using the certificate information; and transmit the file data to which the signature information is added to another device, wherein the processor is further configured to detect that the storage medium is released from the storage medium holder during generation of the file data; and in response to detecting that the storage medium is released during generation of the file data, the processor is further configured to generate the file data and temporarily store the file data as an incomplete job, and to store information including a path of the file data of the incomplete job in the memory after continuing the file data generation processing until completion.

2. The image processing device according to claim 1, wherein the processor is further configured to execute user authentication of the user using the certificate information.

3. The image processing device according to claim 2, wherein in a case where the user authentication succeeds with respect to the storage medium newly inserted into the storage medium holder by the user, the processor is further configured to execute processing of adding the signature information of the file data of the incomplete job to the file data of the incomplete job using the certificate information stored in the storage medium in a case where there is the file data of the incomplete job related to the user for which the user authentication is successful.

4. The image processing device according to claim 3, wherein the processor is further configured to execute processing of adding the signature information in a case where there is the file data of the incomplete job related to the user for which the user authentication is successful, and in a case where the file data of the incomplete job is within a predetermined storage period.

5. The image processing device according to claim 3, wherein the processor is further configured to delete the file data of the incomplete job stored temporarily in the memory after adding the signature information to the file data of the incomplete job.

6. The image processing device according to claim 3, wherein the processor is further configured to delete the file data of the incomplete job stored temporarily in the memory in a case where the user authentication fails.

7. The image processing device according to claim 4, wherein the processor is further configured to notify the user that there is the file data of the incomplete job, and to allow the user to select whether to restart the incomplete job in a case where there is the file data of the incomplete job related to the user for which the user authentication is successful, and in a case where the file data of the incomplete job is within the predetermined storage period.

8. The image processing device according to claim 4, wherein the processor is further configured to delete the file data of the incomplete job stored temporarily in the memory in a case where the file data of the incomplete job exceeds the predetermined storage period.

9. The image processing device according to claim 7, wherein the processor is further configured to display a screen notifying the user that there is the incomplete job and prompting the user to determine whether to restart the incomplete job.

10. The image processing device according to claim 7, wherein the processor is further configured to delete the file data of the incomplete job stored temporarily in the memory in a case where the user selects not to restart the incomplete job.

11. A non-transitory computer-readable medium including programmed instructions that cause a processor to:

read certificate information stored in a storage medium inserted into a storage medium holder by a user;

execute file data generation processing to generate file data;

add, to the file data, signature information with respect to the file data using the certificate information; and transmit the file data to which the signature information is added to another device, wherein the programmed instructions further cause the processor to:

detect that the storage medium is released from the storage medium holder during generation of the file data; and in response to detecting that the storage medium is released during generation of the file data:

generate the file data and temporarily storing the file data as an incomplete job; and store information including a path of the file data of the incomplete job in memory after continuing the file data generation processing until completion.

12. The non-transitory computer-readable medium according to claim 11, wherein the programmed instructions further cause the processor to:

execute user authentication of the user using the certificate information.

13. The non-transitory computer-readable medium according to claim 12, wherein in a case where the user authentication succeeds with respect to the storage medium newly inserted into the storage medium holder by the user, the programmed instructions further cause the processor to execute processing of adding the signature information of the file data of the incomplete job to the file data of the incomplete job using the certificate information stored in the storage medium in a case where there is the file data of the incomplete job related to the user for which the user authentication is successful.

14. The non-transitory computer-readable medium according to claim 13, wherein the programmed instructions further cause the processor to execute processing of adding the signature information in a case where there is the file data of the incomplete job related to the user for which the user authentication is successful, and in a case where the file data of the incomplete job is within a predetermined storage period.

15. The non-transitory computer-readable medium according to claim 13, wherein the programmed instructions further cause the processor to delete the file data of the incomplete job stored temporarily in the memory after adding the signature information to the file data of the incomplete job.

16. The non-transitory computer-readable medium according to claim 13, wherein the programmed instructions further cause the processor to delete the file data of the incomplete job stored temporarily in the memory in a case where the user authentication fails.

17. The non-transitory computer-readable medium according to claim 14, wherein the programmed instructions further cause the processor to notify the user that there is the file data of the incomplete job, and to allow the user to select whether to restart the incomplete job in a case where there is the file data of the incomplete job related to the user for which the user authentication is successful, and in a case where the file data of the incomplete job is within the predetermined storage period.

18. The non-transitory computer-readable medium according to claim 14, wherein the programmed instructions further cause the processor to delete the file data of the incomplete job stored temporarily in the memory in a case where the file data of the incomplete job exceeds the predetermined storage period.

19. The non-transitory computer-readable medium according to claim 17, wherein the programmed instructions further cause the processor to display a screen notifying the user that there is the incomplete job and prompting the user to determine whether to restart the incomplete job.

20. The non-transitory computer-readable medium according to claim 17, wherein the programmed instructions further cause the processor to delete the file data of the incomplete job stored temporarily in the memory in a case where the user selects not to restart the incomplete job.

* * * * *